US011469055B2

(12) United States Patent
Suh et al.

(10) Patent No.: US 11,469,055 B2
(45) Date of Patent: Oct. 11, 2022

(54) PSEUDOCAPACITOR ANODE MATERIAL AND METHOD FOR PREPARING THE SAME

(71) Applicant: LG CHEM, LTD., Seoul (KR)

(72) Inventors: Donghoon Suh, Daejeon (KR); Seokhyun Yoon, Daejeon (KR); Byunggook Lyu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/627,215

(22) PCT Filed: Sep. 21, 2018

(86) PCT No.: PCT/KR2018/011263
§ 371 (c)(1),
(2) Date: Feb. 10, 2020

(87) PCT Pub. No.: WO2019/059719
PCT Pub. Date: Mar. 28, 2019

(65) Prior Publication Data
US 2020/0279696 A1    Sep. 3, 2020

(30) Foreign Application Priority Data

Sep. 25, 2017   (KR) .................. 10-2017-0123725
Sep. 20, 2018   (KR) .................. 10-2018-0113044

(51) Int. Cl.
*H01G 11/46*    (2013.01)
*H01G 11/36*    (2013.01)
*H01G 11/86*    (2013.01)
*B82Y 30/00*    (2011.01)

(52) U.S. Cl.
CPC .............. *H01G 11/46* (2013.01); *B82Y 30/00* (2013.01); *H01G 11/36* (2013.01); *H01G 11/86* (2013.01)

(58) Field of Classification Search
CPC ........ H01G 11/24; H01G 11/36; H01G 11/46; H01G 11/86; Y02E 60/13; B82Y 30/00
USPC ..... 252/506, 507, 508, 514, 518.1; 429/209, 429/218.1, 231.8
See application file for complete search history.

(56) References Cited

U.S. PATENT DOCUMENTS

| | | |
|---|---|---|
| 2011/0053050 A1 | 3/2011 | Lim |
| 2011/0063777 A1 | 3/2011 | Choi |
| 2011/0255212 A1 | 10/2011 | Liu et al. |
| 2011/0281176 A1* | 11/2011 | Seymour ............... H01G 11/46 429/321 |
| 2013/0161570 A1 | 6/2013 | Hwang |
| 2014/0118883 A1 | 5/2014 | Xie |
| 2014/0248531 A1* | 9/2014 | Tan ....................... H01G 11/32 429/188 |
| 2014/0340818 A1 | 11/2014 | Xie et al. |
| 2019/0088420 A1 | 3/2019 | Tour |

FOREIGN PATENT DOCUMENTS

| | | | |
|---|---|---|---|
| CN | 101064216 A | 10/2007 | |
| CN | 105161314 A | 12/2015 | |
| CN | 105712428 A * | 6/2016 | ............... C02F 1/28 |
| CN | 106935419 A | 7/2017 | |
| JP | 2014-125367 A | 7/2014 | |
| JP | 2015-502033 A | 1/2015 | |
| JP | 6197454 B2 | 9/2017 | |
| KR | 10-2009-0082891 A | 7/2009 | |
| KR | 10-1058610 B1 | 8/2011 | |
| KR | 10-2013-0034181 A | 4/2013 | |
| KR | 10-2013-0072747 A | 7/2013 | |
| KR | 10-1280914 B1 | 7/2013 | |
| KR | 10-2015-0109026 A | 10/2015 | |
| KR | 10-2016-0122525 A | 10/2016 | |
| KR | 10-2017-0088961 A | 8/2017 | |
| WO | 2012/112818 A2 | 8/2012 | |
| WO | 2013070989 A1 | 5/2013 | |
| WO | WO-2016099403 A1 * | 6/2016 | ............. H01G 11/46 |

OTHER PUBLICATIONS

Zhao "Synthesis of Cu-Doped Vanadium Oxide/Graphene Hybrid Material for High Performance Electrochemical Capacitor." http://www.iccm-central.org/Proceedings/ICCM20proceedings/papers/paper-1321-2.pdf, 20th International Conference on Composite Materials Copenhagen, Jul. 19-24, 2015 (Year: 2015).*
Yu "Effect of manganese doping on Li-ion intercalation properties of V2O5 films." J. Mater. Chem., 2010, 20, 10841-10846 (Year: 2010).*
Park "Manganese vanadium oxides as cathodes for lithium batteries." Solid State Ionics 176 (2005) 307-312 (Year: 2005).*
Prashanth H. Jampani, et al., "High energy density titanium doped-vanadium oxide-vertically aligned CNT composite electrodes for supercapacitor applications", Journal of Materials Chemistry A, 2015, vol. 3, pp. 8413-8432.
Kim, Il-Hwan et al., "Synthesis and Electrochemical Characterization of Vanadium Oxide on Carbon Nanotube Film Substrate for Pseudocapacitor Applications", Journal of the Electrochemical Society, vol. 153, pp. A989-A996, Apr. 10, 2006.

* cited by examiner

*Primary Examiner* — Tri V Nguyen
(74) *Attorney, Agent, or Firm* — Dentons US LLP

(57) ABSTRACT

An anode material including a metal oxide-conductive inorganic material complex including a metal oxide and a conductive inorganic material bound to the metal oxide, wherein the complex is doped with one or more doping elements selected from the group consisting of transition metals and amphoteric metal elements, and a preparation method thereof, are provided.

6 Claims, 22 Drawing Sheets

(a)

(b)

2

PSEUDOCAPACITOR ANODE MATERIAL AND METHOD FOR PREPARING THE SAME

The present application is a National Phase entry pursuant to 35 U.S.C. § 371 of PCT/KR2018/011263 filed Sep. 21, 2019, and claims priority to and the benefit of, Korean Patent Application Nos. 10-2017-0123725 and 10-2018-0113044, filed on Sep. 25, 2017 and Sep. 20, 2018, respectively, the disclosures of which are hereby incorporated by reference herein in their entirety.

FIELD

The present invention relates to an anode material for a pseudocapacitor having excellent specific capacitance characteristics, and a preparation method thereof.

BACKGROUND

Electrochemical capacitors are devices that store electrical energy by forming an electrical double layer between the surface of an electrode and an electrolyte. Unlike batteries in which electricity is generated by a chemical reaction, capacitors generate electricity by an electric double layer. Thus, capacitors have an almost infinite lifetime without damage to the electrode itself, and can store a large amount of current in a short time owing to their short charge/discharge time. For this reason, capacitors are electrical storage devices which may be usefully applied in fields where a high output power is required.

With recent increasing demand for energy storage devices having both high energy density and high output power, many studies have been actively conducted on supercapacitors as energy storage devices having a higher energy density than known general capacitors and having excellent output characteristics compared to lithium ion batteries. Based on the energy storage mechanisms, supercapacitors may be classified as electrical double-layer capacitors (EDLCs) and pseudocapacitors.

EDLCs are based on the electrochemical phenomenon of the surface of carbon materials. Although EDLCs exhibit high output characteristics, they are applied only in limited fields because of relatively low energy density.

To overcome the low capacitance of carbon material based EDLCs, studies have been actively conducted on pseudocapacitors that store charges through a faradaic reaction occurring on a nanostructured surface, and exhibit greater capacitance through reversible oxidation/reduction reactions at the electrode/electrolyte interface.

However, anode materials for pseudocapacitors operating in aqueous electrolytes are limited, and it is very important to study the anode materials. Although vanadium oxide is known as a representative anode material, performance to satisfy the demand for improvement of the low output characteristics due to low capacitance and low electrical conductivity has not been realized.

Further, in order to improve capacitance and output characteristics by controlling physical properties of vanadium oxide, various preparation methods such as hydrothermal synthesis, precipitation reaction, etc. have been studied and proposed, but electrochemical performance has not been greatly improved.

SUMMARY

Accordingly, an object of the present invention is to provide an anode material for a pseudocapacitor having excellent specific capacitance characteristics, and a preparation method thereof.

According to one embodiment of the present invention, an anode material for a pseudocapacitor is provided, the anode material including: a metal oxide-conductive inorganic material complex including a metal oxide; and a conductive inorganic material bound to the metal oxide, wherein the complex is doped with one or more doping elements selected from the group consisting of transition metals and amphoteric metal elements.

According to another embodiment of the present invention, a method of preparing an anode material for a pseudocapacitor is provided, the method including: mixing a metal oxide, a conductive inorganic material, and raw materials of a doping element, and adding a carboxylic acid based complexing agent thereto to allow reaction; and heat-treating a resulting reaction product.

Furthermore, according to still another embodiment of the present invention, an anode for a pseudocapacitor including the anode material, and a pseudocapacitor including the same, are provided.

In an anode material for a pseudocapacitor according to the present invention, a metal oxide-conductive inorganic material complex has a plate-shaped laminate structure to allow easy access of an electrolyte to the electrode surface, and the metal oxide-conductive inorganic material complex is doped with a doping element to increase charge transfer between the doping element and the conductive inorganic material, thereby remarkably improving capacitance and output characteristics when applied to an anode of a pseudocapacitor.

DETAILED DESCRIPTION

Figure 1A:
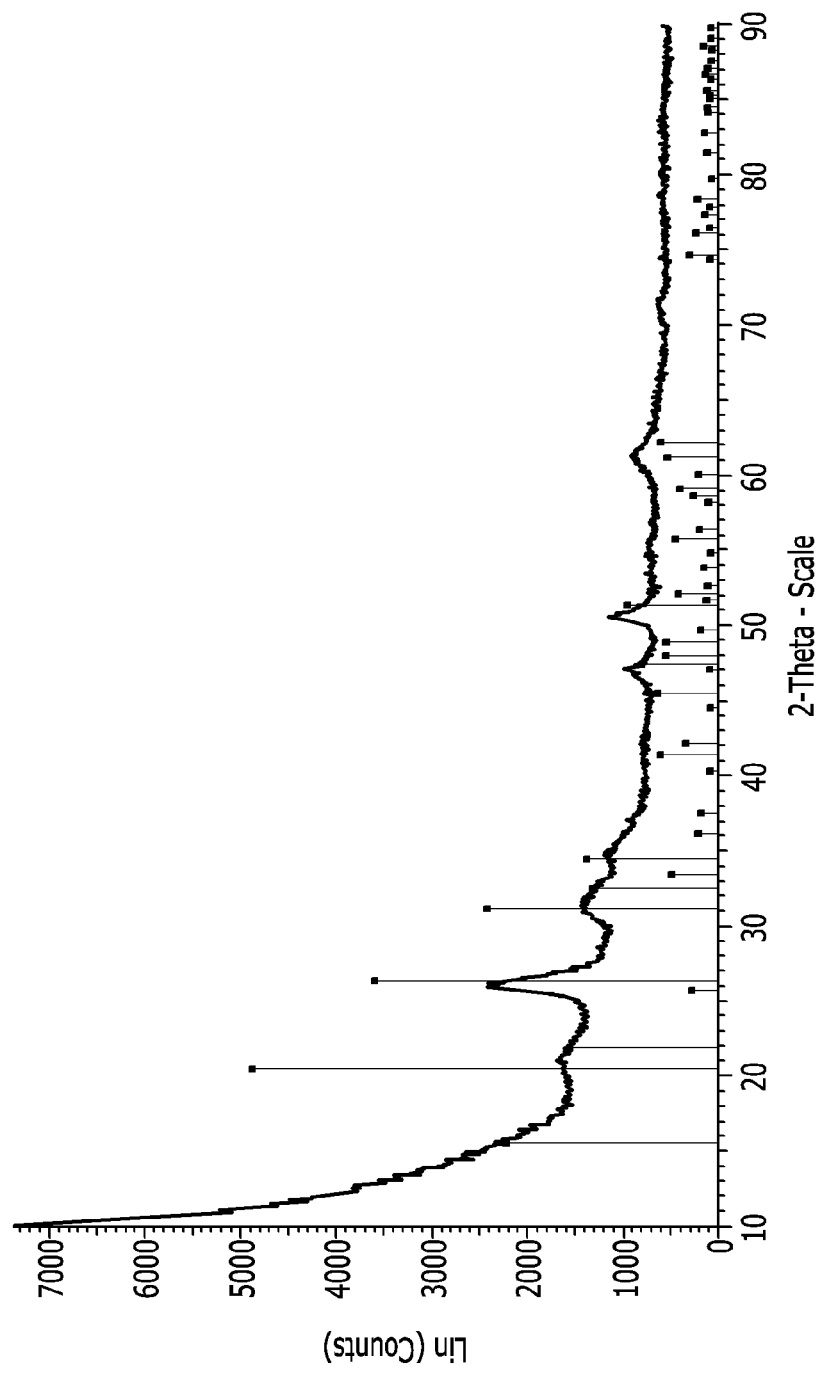
FIG. 1A is a graph showing the result of X-ray powder diffraction (XRD) of a vanadium oxide used in Example 1.

In the present invention, the terms "first", "second", and the like are used to describe a variety of components, and these terms are merely employed to differentiate a certain component from other components.

Further, the terms used in this description are just for explaining exemplary embodiments, and are not intended to restrict the present invention. Singular expressions may include plural expressions unless differently expressed contextually. It must be understood that the term "include", "equip", or "have" in the present description is only used for designating the existence of stated characteristics, numbers, steps, components, or combinations thereof, and do not exclude the existence or the possibility of addition of one or more different characteristics, numbers, steps, components, or combinations thereof.

The present invention may be variously modified and have various forms, and specific examples will be exemplified and explained in detail below. However, it is not intended to limit the present invention to the specific examples, and it must be understood that the present invention includes various modifications, equivalents, or replacements included in the spirit and technical scope of the present invention.

Hereinafter, the present invention will be described in more detail.

An anode material for a pseudocapacitor according to one embodiment of the present invention may include: a metal oxide-conductive inorganic material complex including a metal oxide; and a conductive inorganic material bound to the metal oxide, wherein the complex is doped with one or more doping elements selected from the group consisting of transition metals and amphoteric metal elements.

Specifically, when a metal oxide based anode material for a pseudocapacitor is prepared in the present invention, a metal oxide-conductive inorganic material complex having a plate-shaped laminate structure is formed using a carboxylic acid based complexing agent, and this complex is doped with a doping element. As a result, charge transfer between the doping element and the conductive inorganic material may be increased, and easy access of an electrolyte to the electrode surface may be allowed, thereby remarkably improving capacitance and output characteristics.

More specifically, upon complexing the metal oxide with the conductive inorganic material, a reactive functional group present on the surface of the conductive inorganic material, for example, a hydroxyl based functional group present on the surface of a carbon based material, is reacted with the metal oxide to form a bond by adding the carboxylic acid based complexing agent. In this regard, when the metal oxide has a plate-shaped structure like vanadium oxide, the carbon based material is interposed and laminated between a plurality of plate-shaped vanadium oxides to form a plate-shaped laminate structure. As a result, access of an electrolyte to the electrode surface becomes excellent, thereby further improving capacitance and output characteristics of a pseudocapacitor including the same.

Further, according to one embodiment of the present invention, the effects may be further improved by optimizing contents of the metal oxide and the conductive inorganic material in the complex. Specifically, the complex may include the metal oxide in an amount of 1 part by weight to 30 parts by weight with respect to 100 parts by weight of the conductive inorganic material. When the content of the metal oxide is within the above range, excellent capacitance and output characteristics may be achieved without concerns about deterioration of the effects due to aggregation and uneven dispersibility of the complex or relative reduction of a conducting path of the carbon based material. More specifically, the metal oxide may be included in an amount of 10 parts by weight to 15 parts by weight with respect to 100 parts by weight of the conductive inorganic material.

Meanwhile, in the complex, the conductive inorganic material may be a carbon based material such as carbon nanotubes (CNT), carbon nanofiber (CNF), carbon nanorods (CNRs), vapor grown carbon fiber (VGCF), graphene, activated carbon, etc. Among them, fibrous carbon based materials such as CNT, CNF, CNRs, and VGCF may be used. These materials may be used alone or in a mixture of two or more thereof.

As used herein, the term 'fibrous' encompasses all of rods, tubes, fibers, and similar forms thereof which are long in the major axis direction, in which a ratio of the major axis (length) passing through the center of the carbon based material to the minor axis (diameter) being perpendicular to the major axis and passing through the center of the carbon based material, i.e., a ratio of length to diameter, is greater than 1.

Further, the conductive inorganic material may be MXene which is known as an electromagnetic wave-shielding material. MXene has a layered structure composed of an early transition metal (M) layer and an X layer containing at least one of carbon and nitrogen, similar to graphene, and has excellent conductivity. The early transition metal (M) may be Sc, Ti, V, Cr, Zr, Nb, Mo, Hf, Ta, etc. Among them, any one or two or more thereof may be included.

Specifically, the MXene may include carbide based materials such as $Ti_2C$, $(Ti_{0.5}, Nb_{0.5})_2C$, $V_2C$, $Nb_2C$, $Mo_2C$, $Ti_3C_2$, $Zr_3C_2$, $Hf_3C_2$, $Nb_4C_3$, $Ta_4C_3$, $Mo_2TiC_2$, $Cr_2TiC_2$ and $Mo_2Ti_2C_3$; nitride based materials such as $Cr_2N$ and $Ti_4N_3$; and carbonitride based materials such as $Ti_3CN$. Among them, any one or two or more thereof may be used. Among them, any one or two or more of $Ti_3C_2$, $Nb_2C$, and $V_2C$, which are porous to provide a larger specific surface area, may be used.

Considering that remarkable effects may be obtained by control of the conductive inorganic material, the conductive inorganic material may more specifically be CNT. CNT may exhibit excellent effects in terms of improving capacitance because CNT has pores in the center, the ballistic electron tunneling effect, and excellent strength to maintain the particle shape during charge/discharge. More specifically, CNT having a diameter of 1 nm to 200 nm, or 5 nm to 50 nm, or 5 to 20 nm may be used.

In the present invention, the diameter of CNT may be measured according to a common method, such as observation under a scanning electron microscope, etc.

Further, the carbon nanotube may be specifically a single-walled, double-walled, or multi-walled carbon nanotube. Among them, a multi-walled CNT capable of exhibiting excellent electrical and mechanical properties due to its characteristic structure may be used.

Meanwhile, in the complex, the metal oxide may specifically be an oxide including one or more metals selected from the group consisting of V, Sn, Ru, Ir, Ta, Mn, Mo, and Ti. Among them, a metal oxide having a plate-shaped structure may be used, and more specifically, a vanadium oxide such as vanadium pentoxide ($V_2O_5$) may be used.

When vanadium oxide is used, its shape and particle size are not particularly limited, and although its shape may change according to the kind of the carboxylic acid based complexing agent, vanadium oxide having a plate shape is preferred in order to improve capacitance by increasing the contact area with an electrolyte.

Meanwhile, as used herein, the term "plate shape" means a shape in which two corresponding or facing surfaces are flat and the size in the horizontal direction is larger than the size in the vertical direction, and may include a flake shape, a scale shape, etc., which is similar to the plate shape, as well as a complete plate shape.

Further, the complex may include one or more doping elements selected from the group consisting of transition metals and amphoteric metal elements.

Specifically, the doping element may be included in the complex such that it is doped into the metal oxide, the conductive inorganic material, or both. More specifically, the doping element may be included inside the crystal structure of the metal oxide or the conductive inorganic material, or may be located on the surface thereof through a physical or chemical bond. Of the cases, when the doping element is doped into the crystal structure of the metal oxide, stability of the crystal structure may be improved, and when the doping element is doped into the conductive inorganic material, charge transfer between the doping element and the carbon based material may be increased, thereby further enhancing the effect of improving capacitance and output characteristics.

Specifically, the doping element may include transition metal elements such as Mn, Cr, Cu, Mo, Ni, Ti, etc.; or amphoteric metal elements such as Al, Zn, Sn, Bi, etc. Among them, any one or two or more thereof may be used. When any one or two or more selected from the group consisting of transition metals including Mn, Cr, and Mo, and amphoteric metal elements including Al is used, conductivity may be improved due to increased charge transfer of the surface of the electrode material, and thus an excellent capacitance improvement effect may be obtained. More specifically, at least one of Mn and Al may be used, and much more specifically, Mn may be used.

Further, upon doping with the doping element, the doping amount may be optimized to further enhance the capacitance improvement effect by doping. Specifically, the doping element may be included in an amount of 0.1 at % to 30 at %, more specifically 0.1 at % or more, or 0.3 at % or more, and 20 at % or less, or 10 at % or less, or 5 at % or less, with respect to the total amount of the atoms constituting the complex.

Much more specifically, in the complex, when the metal oxide is vanadium oxide, the conductive inorganic material is carbon nanotubes, and the doping element is at least one of Al and Mn, capacitance and output characteristics of a pseudocapacitor may be further enhanced. When their contents in the above-described combination are optimized, the effect may be further improved.

Meanwhile, the anode material for a pseudocapacitor may be prepared by a method including the steps of: mixing the metal oxide, the conductive inorganic material, and raw materials of the doping element, and then adding the carboxylic acid based complexing agent thereto to allow reaction (step 1); and heat-treating a resulting reaction product (step 2). Therefore, according to another embodiment of the present invention, a method of preparing the anode material for a pseudocapacitor is provided.

Specifically, in the method of preparing the anode material for a pseudocapacitor, step 1 is a step of mixing the metal oxide, the conductive inorganic material, and raw materials of the doping element, and the carboxylic acid based complexing agent to allow reaction.

The metal oxide and the conductive inorganic material are the same as described above, and they may be used in amounts to meet the above-described content range of the metal oxide and the conductive inorganic material in the complex. Further, the metal oxide may be dissolved in a hydrogen peroxide solution or an acid such as hydrochloric acid to be used in a solution state, and the carbon based material may be dispersed in water or a dispersion medium such as carboxymethylcellulose to be used in a dispersed state.

The raw material of the doping element may be any one or a mixture of two or more selected from the group consisting of a sulfate, a nitrate, a chloride, an acetate, and a carbonate containing the doping element, and in this regard, the doping element is the same as described above. More specifically, a sulfate containing the doping element may be used, and much more specifically, a sulfate containing at least one of Mn and Al may be used.

The use amount of the raw material of the doping element may be determined within the content range of the doping element in the complex as described above.

Further, the carboxylic acid based compounding agent introduces a reactive functional group such as a carboxyl group, a hydroxyl group, or an amino group to the surface of the conductive inorganic material to provide a nucleation site for deposition of the metal oxide. As a result, binding of the conductive inorganic material with the metal oxide is facilitated to form the metal oxide-conductive inorganic material complex. When the metal oxide has a plate-shaped structure, a complex having a plate-shaped laminate structure is formed. Further, the carboxylic acid based complexing agent may form a chelate structure with metal ions in the electrolyte composition, and this chelate structure may increase a charge/discharge capacity of a battery. Further, the carboxylic acid based complexing agent may improve the stability and reactivity of metal ions, inhibit side reactions, and reduce internal resistance.

The carboxylic acid based complexing agent is a compound containing one or more carboxyl groups in the molecule. Specifically, the carboxylic acid based complexing agent may include a monocarboxylic acid such as formic acid, acetic acid, propionic acid, butyric acid, valeric acid, hexanoic acid, heptanoic acid, caprylic acid, nonanoic acid, decanoic acid, undecylenic acid, lauric acid, tridecylic acid, myristic acid, pentadecanoic acid, and palmitic acid; a dicarboxylic acid such as oxalic acid, malonic acid, succinic acid, glutaric acid, adipic acid, pimelic acid, suberic acid, azelaic acid, sebacic acid, maleic acid, fumaric acid, glutaconic acid, traumatic acid, muconic acid, phthalic acid, isophthalic acid, and terephthalic acid; a polycarboxylic acid having three or more carboxyl groups such as citric acid, isocitric acid, aconitic acid, and mellitic acid; etc. Among them, any one or a mixture of two or more thereof may be used. Further, the carboxylic acid based complexing agent may be an amino acid containing an amino group together with a carboxyl group. Specific examples thereof may include glutamine, lysine, histidine, serine, threonine, tyrosine, cystine, cysteine, arginine, proline, glutamic acid, aspartic acid, asparagine, and glutamine. Among them, any one or a mixture of two or more thereof may be used.

Considering an excellent effect of the complexing agent, acetic acid, citric acid, aspartic acid, or a mixture thereof may be used, and more specifically, L-aspartic acid may be used.

The carboxylic acid based complexing agent may be used in a molar ratio of 1 to 50, and more specifically, in a molar ratio of 4 to 40, with respect to 1 mol of the raw material of the doping element. Further, the carboxylic acid based complexing agent may be used in an amount of 200 parts by weight to 1000 parts by weight, more specifically 200 parts by weight to 500 parts by weight, and much more specifically 300 parts by weight to 400 parts by weight, with respect to 100 parts by weight of the metal oxide, under conditions satisfying the content ratio range with respect to the raw material of the doping element. When the carboxylic acid based complexing agent is used in the above content range, the effect of the complexing agent may be sufficiently obtained without concerns about occurrence of side reactions due to the remaining unreacted complexing agent.

The carboxylic acid based complexing agent may be a solid or a liquid, and may be introduced in the form of a solution or dispersion. More specifically, the carboxylic acid based complexing agent may be dissolved in a mixture of water and acid to be introduced in a solution state. In this regard, the acid serves to assemble and maintain nanoparticles in the form of a plate-shaped structure, and specifically, ascorbic acid or hydrochloric acid may be used. The acid may be used in an amount of 5 ml to 20 ml with respect to 100 ml of water.

Reaction of the metal oxide, the conductive inorganic material, and the raw materials of the doping element with the carboxylic acid based complexing agent may proceed by mixing the metal oxide, the conductive inorganic material, and the raw materials of the doping element, and then introducing the carboxylic acid based complexing agent thereto.

In this regard, mixing of the metal oxide, the conductive inorganic material, and the raw materials of the doping element may be carried out by a common method. Optionally, a process for homogenous mixing such as stirring, etc. may be further carried out.

In addition, an alcohol based compound may be further introduced before introducing the carboxylic acid based complexing agent after mixing the metal oxide, the conductive inorganic material, and the raw materials of the doping element.

The alcohol based compound serves to increase synthesis yield, and specifically, ethanol, etc. may be used. The alcohol based compound may be introduced in an amount of 100 parts by weight to 200 parts by weight with respect to 100 parts by weight of the mixture of the raw materials of the metal oxide, the conductive inorganic material, and the doping element.

Further, the reaction of the raw materials of the metal oxide, the conductive inorganic material, and the doping element with the carboxylic acid based complexing agent may be performed at 40° C. to 80° C., and more specifically 60° C. to 70° C. When the reaction is performed within the above temperature range, the reaction may occur with excellent efficiency without concerns about overreaction or underreaction.

Further, in order to increase the reaction efficiency, a process of refluxing, etc. may be optionally performed.

A reaction product is precipitated, resulting from the reaction of the metal oxide, the conductive inorganic material, and the raw materials of the doping element with the carboxylic acid based complexing agent.

The precipitated reaction product is subjected to a separation process according to a common method such as centrifugation, etc., and the separated reaction product is subjected to a process of removing impurities using a washing solvent such as water, ethanol, etc.

Further, the separated and washed reaction product is optionally subjected to a drying process. The drying process may be performed using a common method. However, in the present invention, a freeze-drying method may be used in order to maintain the morphology of the plate-shaped complex and to prevent the aggregation phenomenon during drying.

Next, step 2 is a step of preparing the anode material by heat-treating the reaction product obtained in step 1.

In the reaction product obtained in step 1, the raw material of the doping element is bound to the complex formed by binding of the metal oxide to the conductive inorganic material via a functional group derived from the carboxylic acid based compound. When this reaction product is heat-treated, an anode material is obtained, in which the doping element in the element state is doped into the complex having a plate-shaped laminate structure where the conductive inorganic material is interposed between the plate-shaped metal oxides.

The heat-treatment process may be performed at 250° C. to 350° C., and more specifically, 270° C. to 300° C. When the heat-treatment is performed within the above temperature range, the anode material may be obtained with excellent efficiency without concerns about by-product production due to underreaction or overreaction.

With regard to the anode material prepared according to the above-described preparation method, the metal oxide-conductive inorganic material complex has the plate-shaped laminate structure to allow easy access of an electrolyte to the electrode surface, and the metal oxide-conductive inorganic material complex is doped with the doping element to increase charge transfer between the doping element and the conductive inorganic material, thereby remarkably improving capacitance and output characteristics when applied to an anode of a pseudocapacitor.

According to still another embodiment of the present invention, a composition for forming an anode for a pseudocapacitor is provided, the composition including the anode material, as well as an anode for a pseudocapacitor, which is manufactured by using the same.

Specifically, the composition for forming an anode for a pseudocapacitor may include the above-described anode material, and optionally, at least one of a binder and a conductive material.

The conductive material is used to provide an anode with conductivity, and is not particularly limited, as long as it has electrical conductivity without causing chemical changes in the pseudocapacitor. Specific examples thereof may include graphite such as natural or artificial graphite, and carbon based materials such as carbon black, acetylene black, Ketjen black, channel black, furnace black, lamp black, thermal black, carbon fibers, etc. Among them, any one or a mixture of two or more thereof may be used. More specifically, carbon black or acetylene black may be used. The conductive material may be included in an amount of 10 parts by weight to 30 parts by weight with respect to 100 parts by weight of the anode material.

The binder serves to improve adhesion between anode material particles, and adhesive force between the anode material and the collector. Specific examples thereof may include polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene monomer (EPDM), sulfonated-EPDM, styrene butadiene rubber (SBR), fluorine rubber, or various copolymers thereof. These may be used alone or in a mixture of two or more thereof. Among them, any one or a mixture of two or more thereof may be used. Among them, fluorinated polymeric binders capable of exhibiting higher stability with respect to an electrolyte, such as PVDF or PTFE, may be used. The binder may be included in an amount of 10 parts by weight to 20 parts by weight with respect to 100 parts by weight of the anode material.

The anode in the pseudocapacitor may be manufactured by a common method, except that the above-described composition for forming the anode is used. For example, the anode may be manufactured by applying the above-described composition for forming the anode onto a collector such as copper, aluminum, nickel, stainless steel, etc., followed by pressing and drying.

According to still another embodiment of the present invention, an electrochemical device including the anode is provided. The electrochemical device may specifically be a capacitor, and more specifically, a pseudocapacitor.

Specifically, the pseudocapacitor may include a cathode, an anode, a separator interposed between the cathode and the anode, and an electrolyte, wherein the anode is the same as described above.

Configurations and a manufacturing method of the pseudocapacitor may be performed according to common methods, and thus detailed descriptions thereof will be omitted.

EXAMPLES

The present invention will be described in more detail in the following examples. However, the following examples are for illustrative purposes only, and the scope of the present invention is not intended to be limited by the following examples.

Example 1

0.9 g of $V_2O_5$, 30 ml of deionized water, and 20 ml of $H_2O_2$ were put in a round bottom flask, followed by stirring. A dispersion containing 6 g of CNT in 30 ml of deionized water (CNT was introduced in the form of a dispersion prepared by dispersing CNT in CMC (carboxymethylcellulose), and 6 g of CNT means a CNT content in the dispersion to be introduced (CNT concentration in the dispersion=5% by weight, CNT diameter=9~11 nm)) was added thereto, and 0.5 mmol of $Al_2(SO_4)_3$ as a raw material of a doping element was added thereto, followed by mixing. 100 ml of ethanol was added thereto, and to the resulting mixture, a solution prepared by mixing 20 ml of L-aspartic acid (4 mol based on 1 mol of the raw material of the doping element/400 parts by weight with respect to 100 parts by weight of $V_2O_5$), 70 ml of deionized water, and 5 ml of 6 N HCl was added dropwise, followed by refluxing at 60° C. for 12 hours. A resulting precipitate was separated by a centrifuge, and washed with deionized water and ethanol to remove impurities. A resulting product was freeze-dried for 3 days, and then heat-treated in a tube furnace at a temperature of 270° C. for 12 hours to prepare an anode material in which a $V_2O_5$ metal oxide-CNT complex was doped with Al.

Example 2

An anode material in which a $V_2O_5$ metal oxide-CNT complex was doped with Mn was prepared in the same manner as in Example 1, except that 1 mmol of $MnSO_4$ was used instead of 0.5 mmol of $Al_2(SO_4)_3$ in Example 1.

Example 3

An anode material in which a $V_2O_5$ metal oxide-CNT complex was doped with Cu was prepared in the same manner as in Example 1, except that 1 mmol of $Cu(NO_3)_2$ was used instead of 0.5 mmol of $Al_2(SO_4)_3$ in Example 1.

Example 4

0.9 g of $V_2O_5$, 30 ml of deionized water, and 20 ml of $H_2O_2$ were put in a round bottom flask, followed by stirring. 60 g of graphene oxide in 30 ml of deionized water (graphene oxide was introduced in the form of a water dispersion, and 60 g of graphene oxide means a graphene oxide content in the dispersion to be introduced (graphene oxide concentration in the dispersion=5% by weight)) was added thereto, and 1 mmol of $MnSO_4$ as a raw material of a doping element was added thereto, followed by mixing. 100 ml of ethanol was added thereto, and to the resulting mixture, a solution prepared by mixing 20 ml of L-aspartic acid, 70 ml of deionized water, and 5 ml of 6 N HCl was added dropwise, followed by refluxing at 60° C. for 12 hours. A resulting precipitate was separated by a centrifuge, and washed with deionized water and ethanol to remove impurities. A resulting product was freeze-dried for 3 days, and then heat-treated in a tube furnace at a temperature of 270° C. for 12 hours to prepare an anode material in which a $V_2O_5$ metal oxide-graphene complex was doped with Mn.

Comparative Example 1

An anode material of an undoped $V_2O_5$ metal oxide-CNT complex was prepared in the same manner as in Example 1, except that the raw material of the doping element in Example 1 was not used.

Comparative Example 2

0.9 g of $V_2O_5$, 30 ml of deionized water, and 20 ml of $H_2O_2$ were put in a round bottom flask, followed by stirring. 1 mmol of $MnSO_4$ as a raw material of a doping element was added thereto, followed by mixing. 100 ml of ethanol was added thereto, and to the resulting mixture, a solution prepared by mixing 20 ml of L-aspartic acid, 70 ml of deionized water, and 5 ml of 6 N HCl was added dropwise, followed by refluxing at 60° C. for 12 hours. A resulting precipitate was separated by a centrifuge, and washed with deionized water and ethanol to remove impurities. A resulting product was freeze-dried for 3 days, and then heat-treated in a tube furnace at a temperature of 270° C. for 12 hours to prepare an anode material in which a $V_2O_5$ metal oxide-graphene complex was doped with Mn.

Comparative Example 3

1.8 g of $MnO_2$, 30 ml of deionized water, and 20 ml of $H_2O_2$ were put in a round bottom flask, followed by stirring. A dispersion containing 6 g of CNT in 30 ml of deionized water (CNT was introduced in the form of a dispersion prepared by dispersing CNT in CMC (carboxymethylcellulose), and 6 g of CNT means a CNT content in the dispersion to be introduced (CNT concentration in the dispersion=5% by weight, CNT diameter=9~11 nm)) was added thereto, followed by mixing. 100 ml of ethanol was added thereto, and to the resulting mixture, a solution prepared by mixing 20 ml of L-aspartic acid, 70 ml of deionized water, and 5 ml of 6 N HCl was added dropwise, followed by refluxing at ° C. for 12 hours. A resulting precipitate was separated by a centrifuge, and washed with deionized water and ethanol to remove impurities. A resulting product was freeze-dried for 3 days, and then heat-treated in a tube furnace at a temperature of 270° C. for 12 hours to prepare an anode material of an undoped $MnO_2$ metal oxide-CNT complex.

Experimental Example 1

Vanadium oxides used in Examples 1 and 2 were subjected to X-ray powder diffraction (XRD), and the crystal structure thereof was examined using a scanning electron microscope (SEM). The results are shown in FIGS. 1A to 1C and FIGS. 2A to 2C, respectively.

Figure 1B:
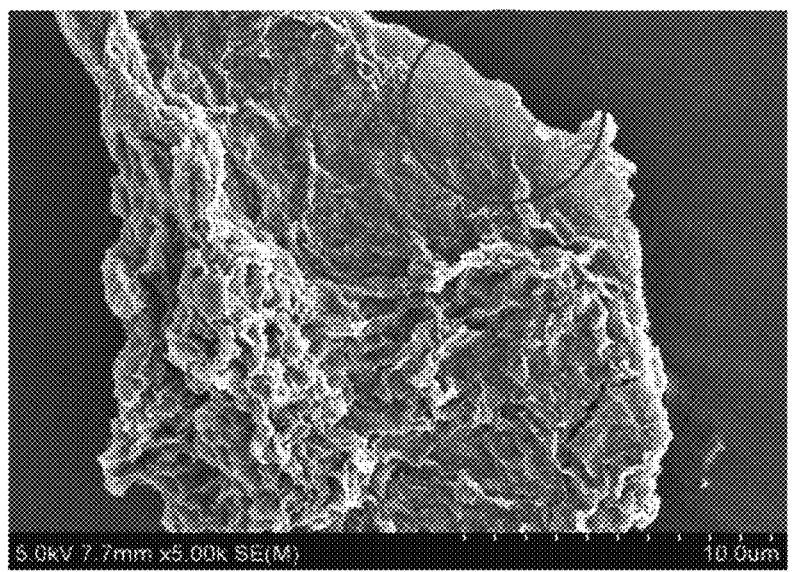
FIG. 1B is a scanning electron microscopic (SEM) image thereof.
Figure 1C:
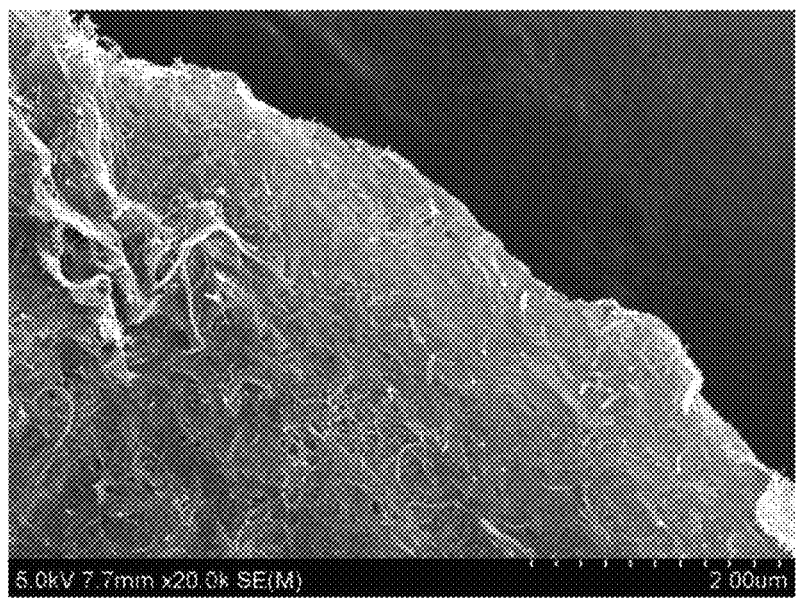
FIG. 1C is an enlarged view of the circled area in FIG. 1B.

FIG. 1A is a graph showing the XRD results of vanadium oxide used in Example 1, FIG. 1B is an SEM image thereof, and FIG. 1C is an enlarged view of the circled area in FIG. 1B.

Figure 2A:
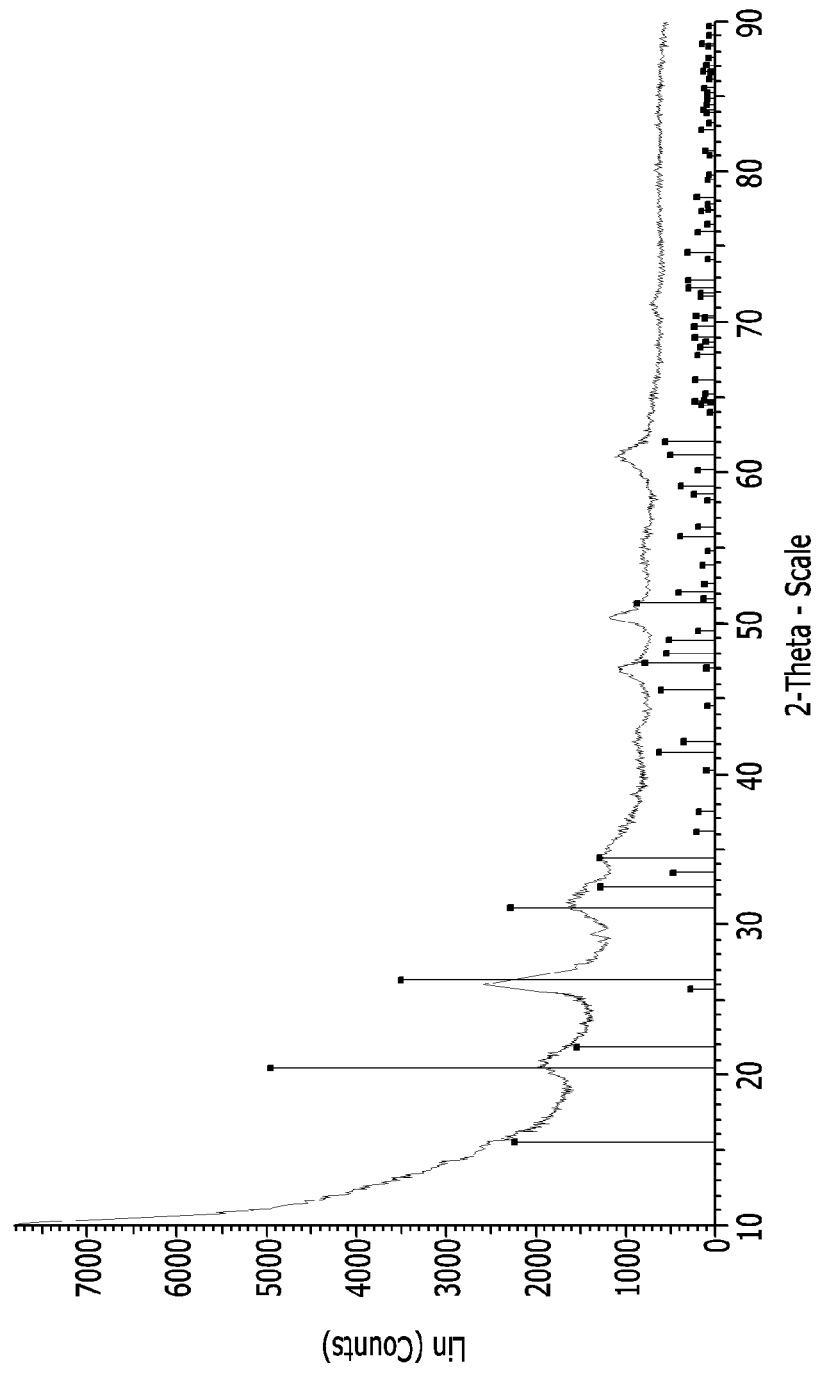
FIG. 2A is a graph showing the result of XRD of a vanadium oxide used in Example 2.
Figure 2B:
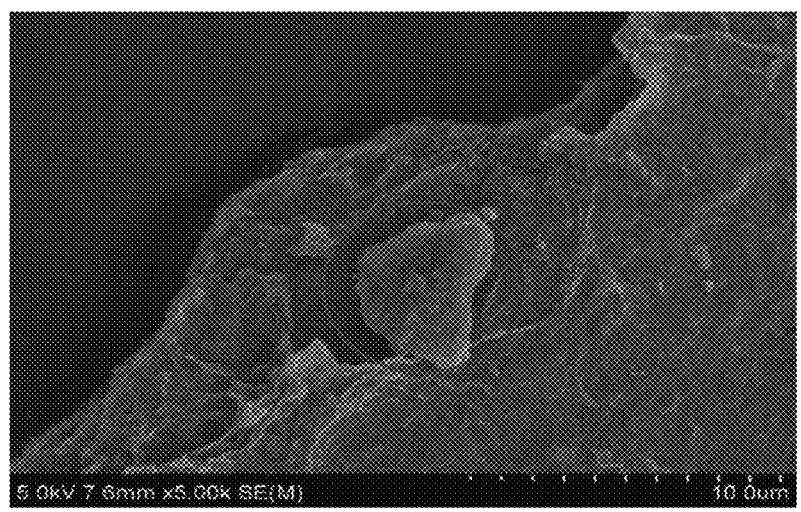
FIG. 2B is a SEM image thereof.
Figure 2C:
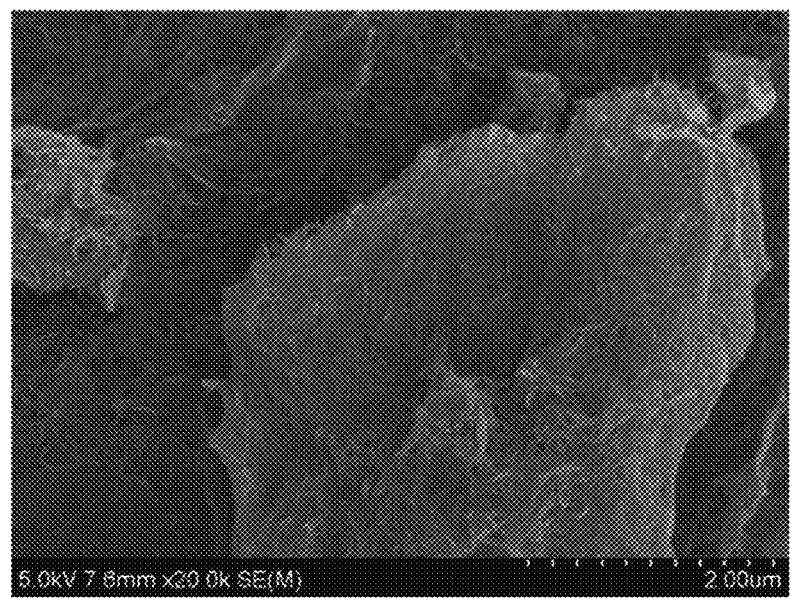
FIG. 2C is an enlarged view of the circled area in FIG. 2B.

FIG. 2A is a graph showing the XRD result of vanadium oxide used in Example 2, FIG. 2B is an SEM image thereof, and FIG. 2C is an enlarged view of the circled area in FIG. 2B.

As shown in FIGS. 1A to 1C and FIGS. 2A to 2C, vanadium oxides used in Examples 1 and 2 had a plate-shaped structure.

As a result, in the anode materials of Examples 1 and 2, the vanadium oxide-carbon based material complex having the plate-shaped laminate structure was doped with the doping element of Al or Mn (doping amount of Al in Example 1 (based on the total amount of the atoms constituting the complex): 0.3 at %, doping amount of Mn in Example 2 (based on the total amount of the atoms constituting the complex): 1.08 at %).

Experimental Example 2

CV curves were obtained by cyclic voltammetry (CV) for each of the compositions for forming the anode prepared in Examples 1, 2, and 4 and Comparative Examples 2 and 3.

In detail, each of the anode materials prepared in Examples 1, 2, and 4 and Comparative Examples 2 and 3, carbon black, and PVDF as a binder were mixed at a weight ratio of 7:2:1 to prepare each of the compositions for forming the anode, and the composition was applied onto a glassy carbon electrode (GCE), and dried under vacuum and at 70° C. for 24 hours. 1 M of a $Li_2SO_4$ electrolyte was impregnated into the manufactured electrode and stabilized, followed by cyclic voltammetry using a platinum counter electrode and an SCE reference electrode. At this time, the cyclic voltammetry was performed in the potential range of −1.1 V to −0.2 V at a scan rate of 10 mV/s.

Capacitance per unit weight greatly depends on the content of vanadium oxide and the specific surface area of the anode material, and may be calculated by dividing the current values in the cyclic voltammogram by the scanning rate and the weight of the electrode active material. The results are shown in FIGS. 9 to 13 and Table 1.

TABLE 1

| | Example 1 | | Example 2 | | Example 4 | | Comparative Example 2 | | Comparative Example 3 | |
|---|---|---|---|---|---|---|---|---|---|---|
| | Capacitance (F/g) | Energy density (Wh/kg) | Capacitance (F/g) | Energy density (Wh/kg) | Capacitance (F/g) | Energy density (Wh/kg) | Capacitance (F/g) | Energy density (Wh/kg) | Capacitance (F/g) | Energy density (Wh/kg) |
| $1^{st}$ | 450.01 | 53.49 | 541.09 | 62.73 | 287.15 | 31.00 | 81.00 | 3.30 | 81.00 | 3.30 |
| $2^{nd}$ | 405.08 | 49.18 | 488.08 | 57.40 | 283.71 | 30.19 | 81.87 | 3.53 | 81.87 | 3.53 |
| $3^{rd}$ | — | — | — | — | 273.16 | 28.58 | 77.85 | 3.42 | 77.85 | 3.42 |
| $4^{th}$ | — | — | — | — | 265.25 | 27.35 | 74.62 | 3.31 | 74.62 | 3.31 |
| $5^{th}$ | 330.65 | 39.92 | 405.08 | 48.14 | 257.27 | 26.50 | 64.06 | 3.17 | 64.06 | 3.17 |

Each of the anode materials prepared in Examples 1 to 3 and Comparative Examples 1 was observed by SEM, and the results are shown in FIGS. 3A to 6.

Figure 3A:
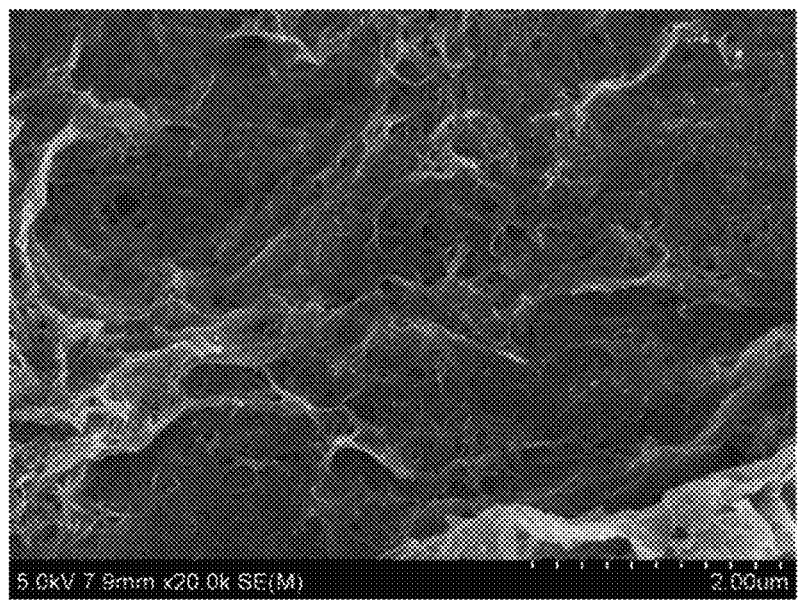
FIGS. 3A to 3C are SEM images of a vanadium oxide-carbon based material complex prepared in Example 1, photographed at different magnifications.
Figure 3B:
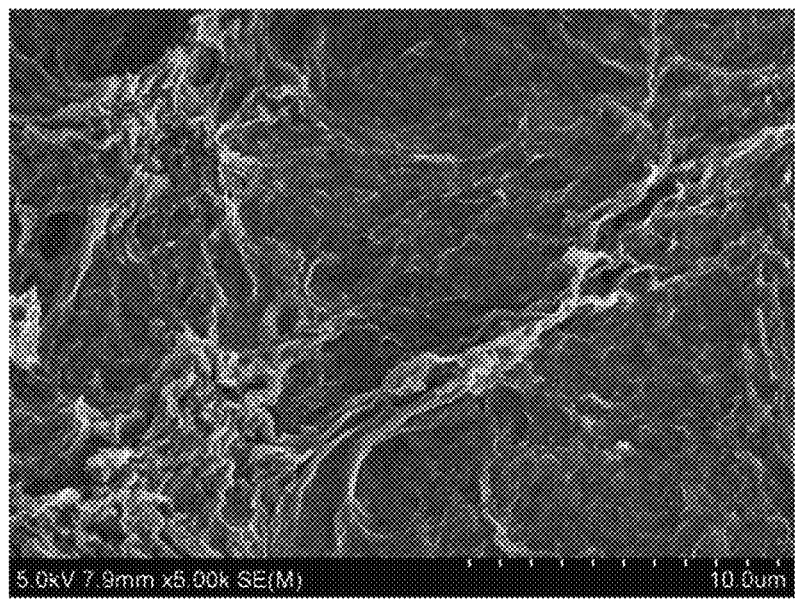
Figure 3C:
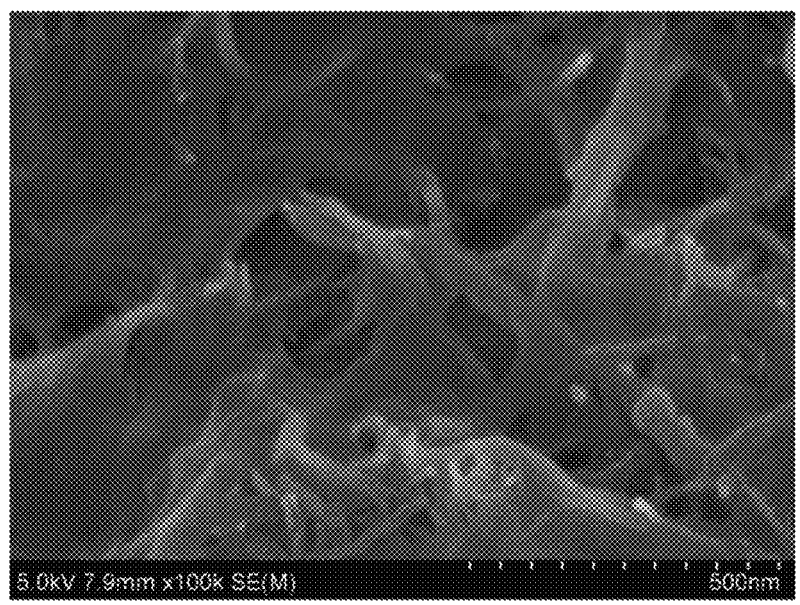
Figure 4A:
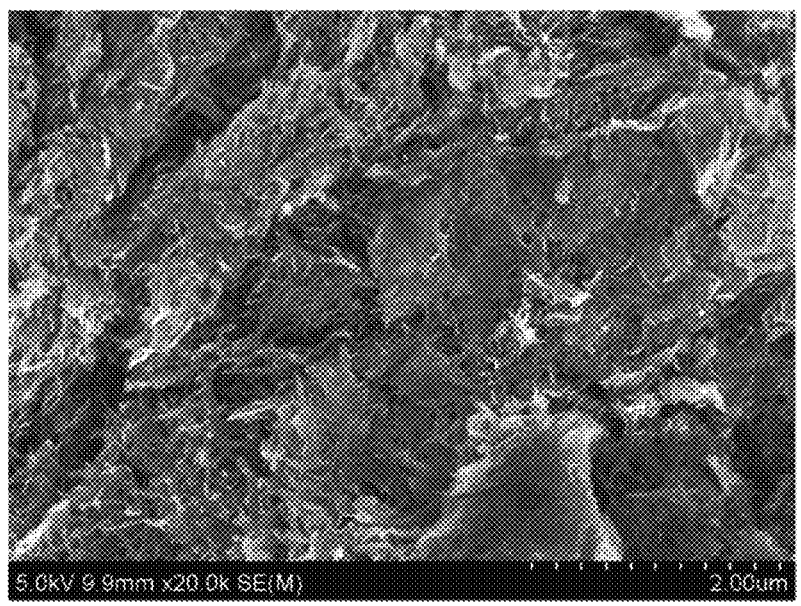
FIGS. 4A to 4C are SEM images of a vanadium oxide-carbon based material complex prepared in Example 2, photographed at different magnifications.
Figure 4B:
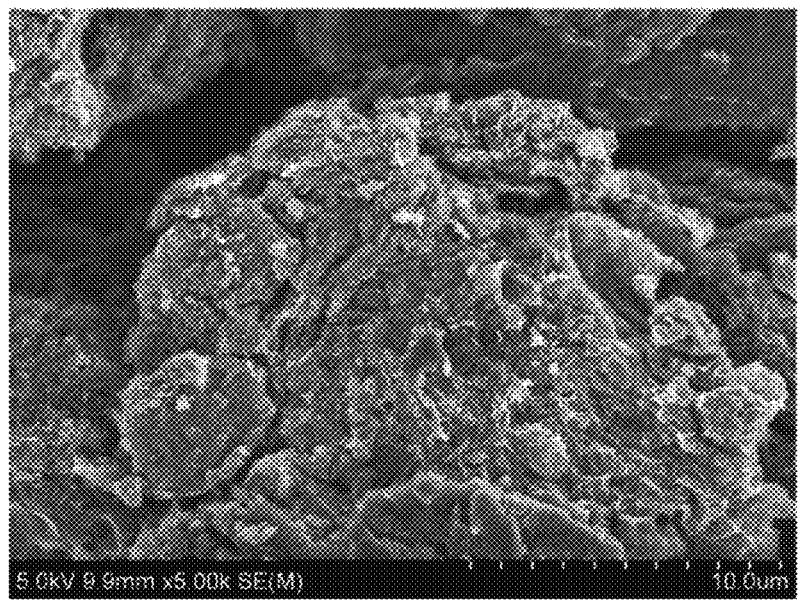
Figure 4C:
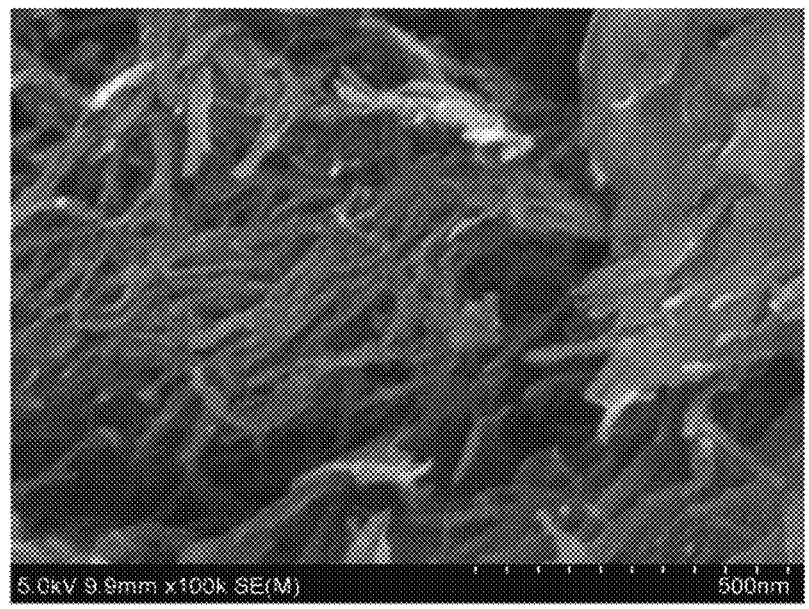
Figure 5:
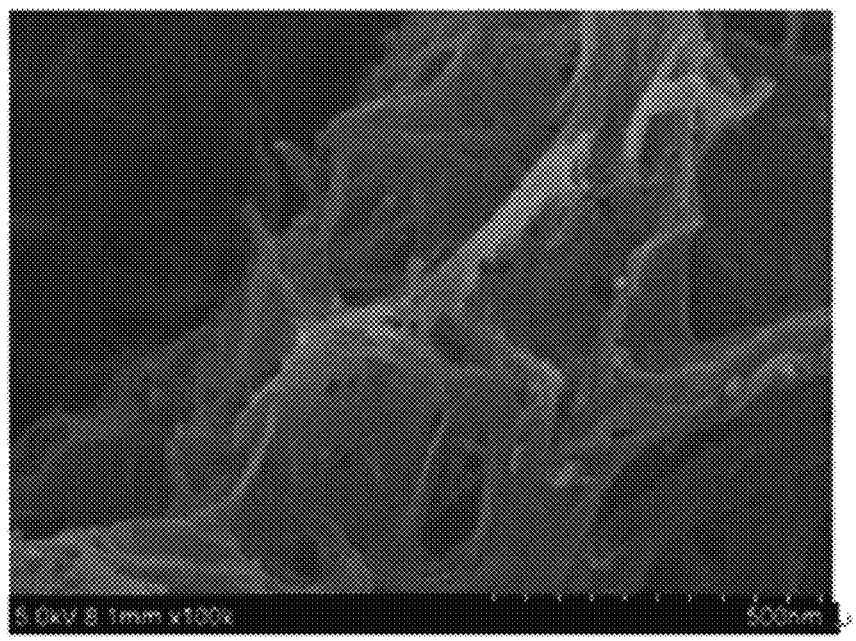
FIG. 5 is a SEM image of a vanadium oxide-carbon based material complex prepared in Example 3.
Figure 6:
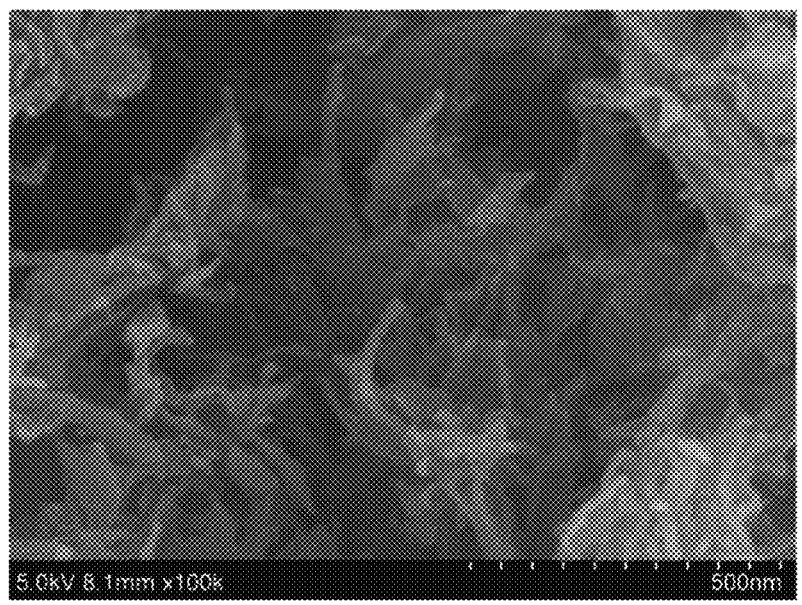
FIG. 6 is a SEM image of a vanadium oxide-carbon based material complex prepared in Comparative Example 1.

FIGS. 3A to 3C are SEM images of the vanadium oxide-carbon based material complex prepared in Example 1, photographed at different magnifications, and FIGS. 4A to 4C are SEM images of the vanadium oxide-carbon based material complex prepared in Example 2, photographed at different magnifications. FIGS. 5 and 6 are SEM images of the vanadium oxide-carbon based material complex prepared in Example 3 and Comparative Example 1.

As a result, the vanadium oxide-carbon based material complexes of Examples 1 to 3 and Comparative Example 1 were found to have a laminate structure in which the carbon based material was interposed between the plate-shaped vanadium oxides.

Figure 7:
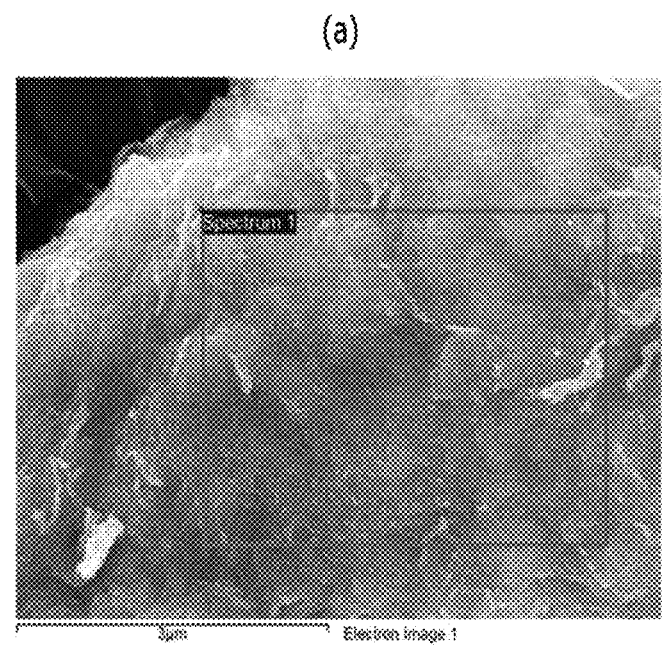
In FIG. 7, a) is an electron microscopic image of an anode material prepared in Example 1, and b) shows the result of elemental analysis using an energy dispersive spectrometer (EDS)
Figure 7:
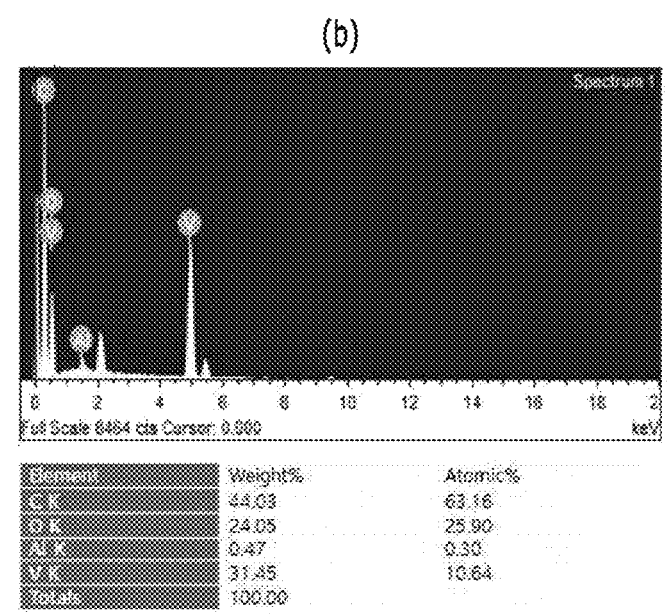
Figure 8:
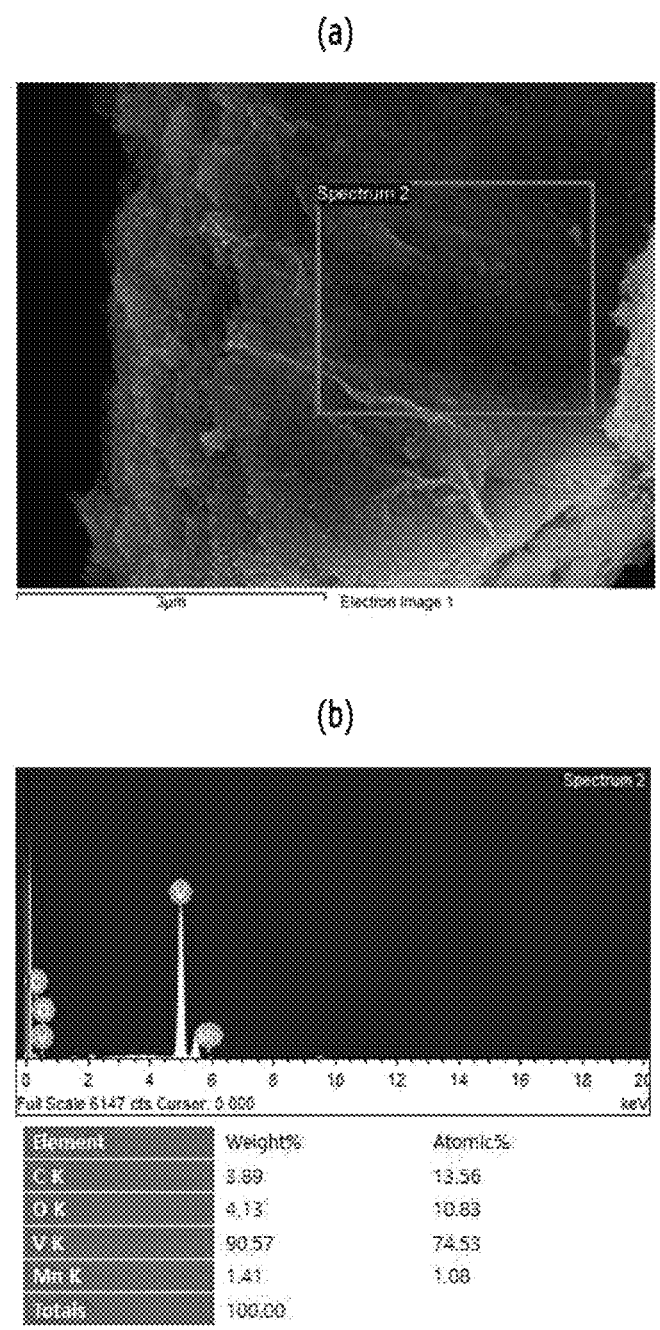
In FIG. 8, a) is an electron microscopic image of an anode material prepared in Example 2, and b) shows the result of elemental analysis using an EDS.
Figure 9:
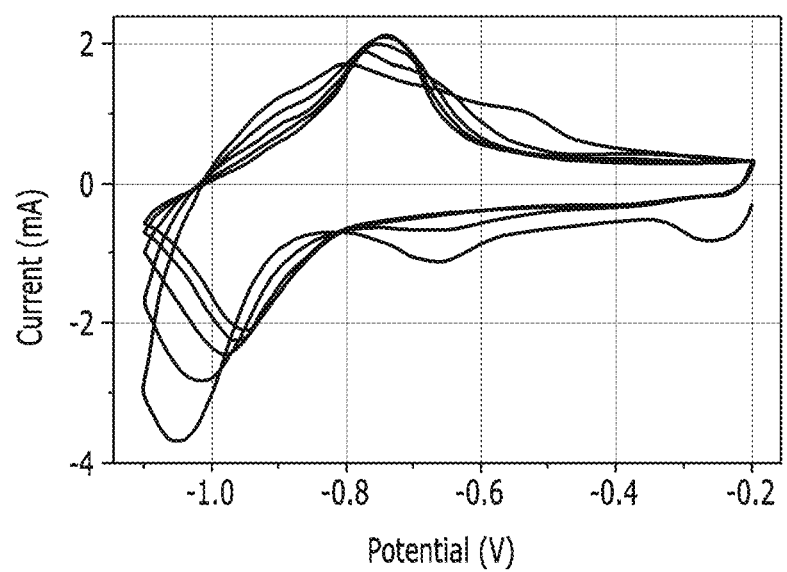
FIG. 9 is a CV curve obtained by cyclic voltammetry for the anode material prepared in Example 1.
Figure 10:
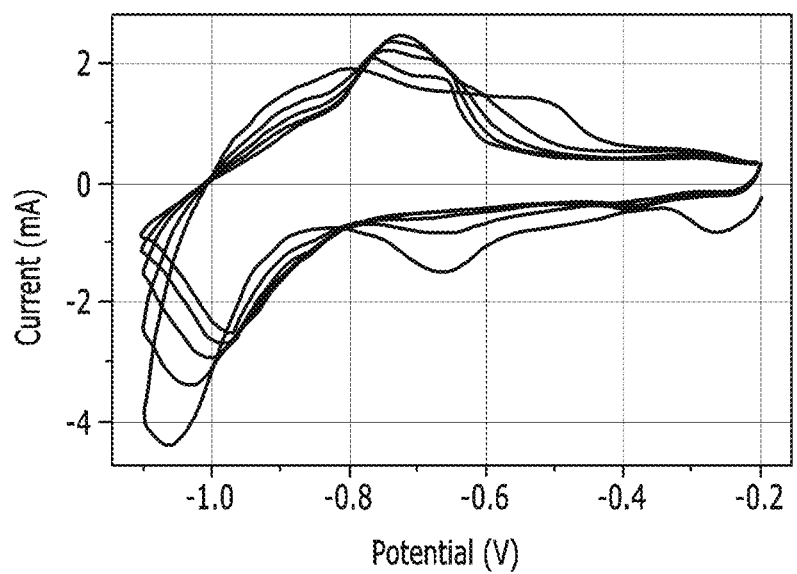
FIG. 10 is a CV curve obtained by cyclic voltammetry for the anode material prepared in Example 2.
Figure 11:
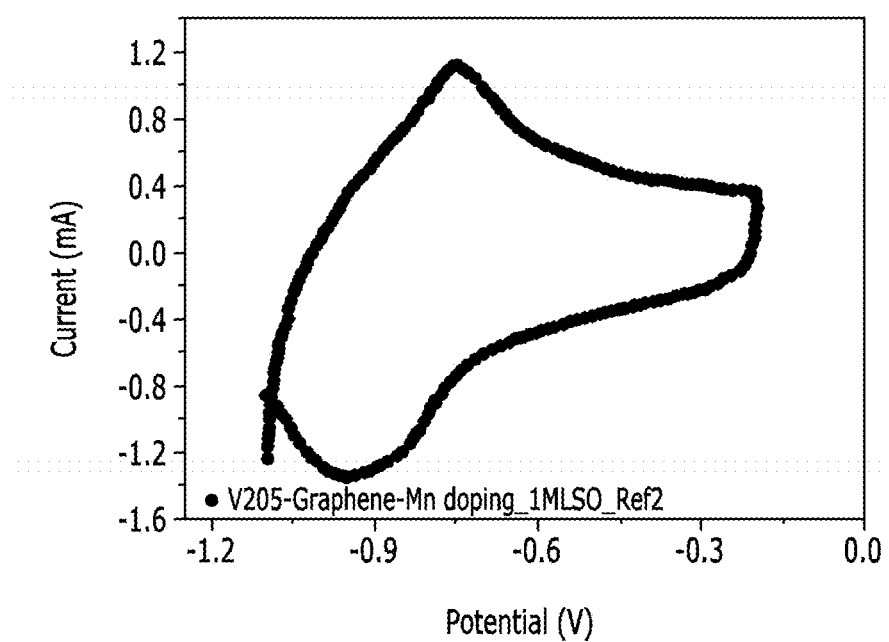
FIG. 11 is a CV curve obtained by cyclic voltammetry for an anode material prepared in Example 4.
Figure 12:
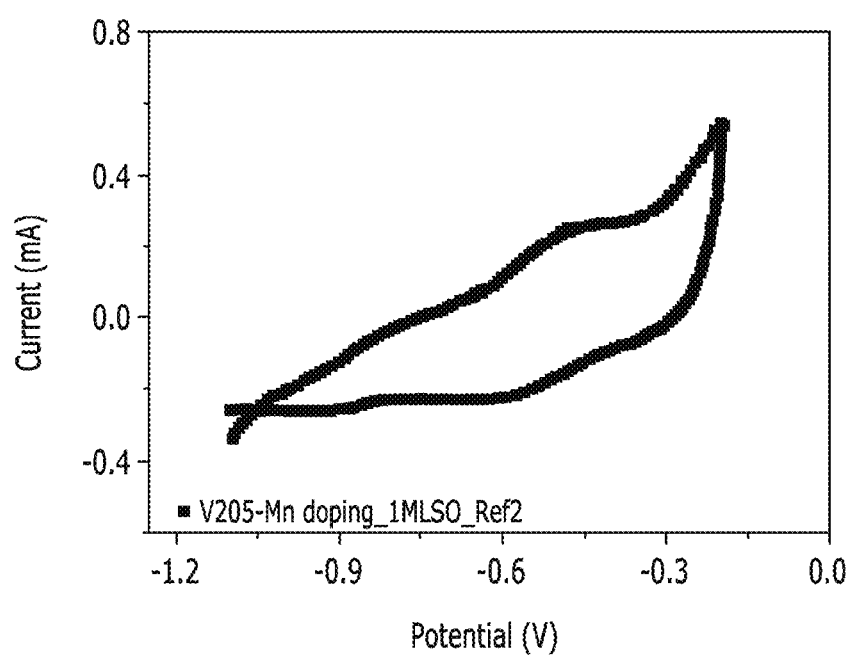
FIG. 12 is a CV curve obtained by cyclic voltammetry for an anode material prepared in Comparative Example 2.
Figure 13:
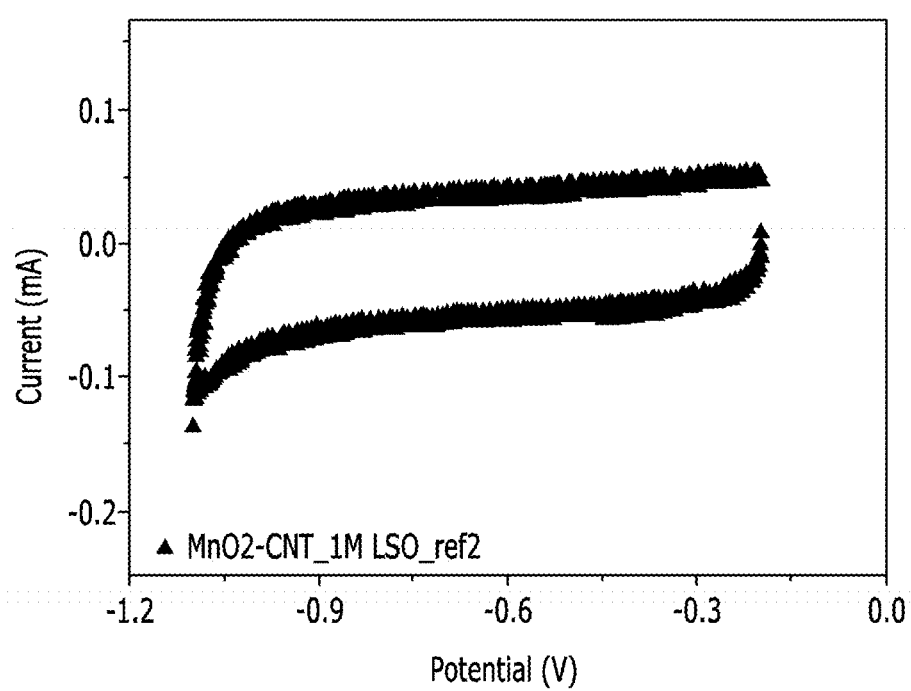
FIG. 13 is a CV curve obtained by cyclic voltammetry for an anode material prepared in Comparative Example 3.

Further, each of the anode materials prepared in Examples 1 and 2 was observed by electron microscopy, and elemental analysis was performed using an EDS. The results are shown in FIGS. 7 and 8, respectively.

In Table 1, "-" indicates no measurement.

As a result of the measurement, the anode materials of Examples 1, 2, and 4 exhibited high capacitance and high energy density, as compared with those of Comparative Examples 2 and 3. Among them, the anode materials of Examples 1 and 2 including CNT as the conductive inorganic material exhibited high capacitance of 450 F/g or more and high energy density of 50 Wh/kg or more due to high conductivity of the CNT, and capacitance of 300 F/g or more and energy density of 30 Wh/kg or more even after the 5th cycle. Such excellent capacitance and energy density characteristics are attributed to the greatly increased specific surface area due to the laminate structure of the anode materials of Examples 1 and 2. In contrast, Example 4 including graphene instead of CNT exhibited relatively low capacitance and energy density due to a low charge transfer ability and a difference of the conducting path, as compared with Examples 1 and 2.

Further, Comparative Example 2 not including the conductive inorganic material such as CNT exhibited very low capacitance and energy density due to a reduced charge transfer ability because of the absence of a conducting bridge which should exist between particles, as compared with the examples, and after the 5th cycle, the difference in the capacitance and energy density was further increased.

Further, Comparative Example 3 including only the metal oxide-conductive inorganic material complex without the doping element exhibited very low capacitance and energy density due to a greatly reduced charge transfer ability, as compared with the examples including the doping element.

Figure 14:
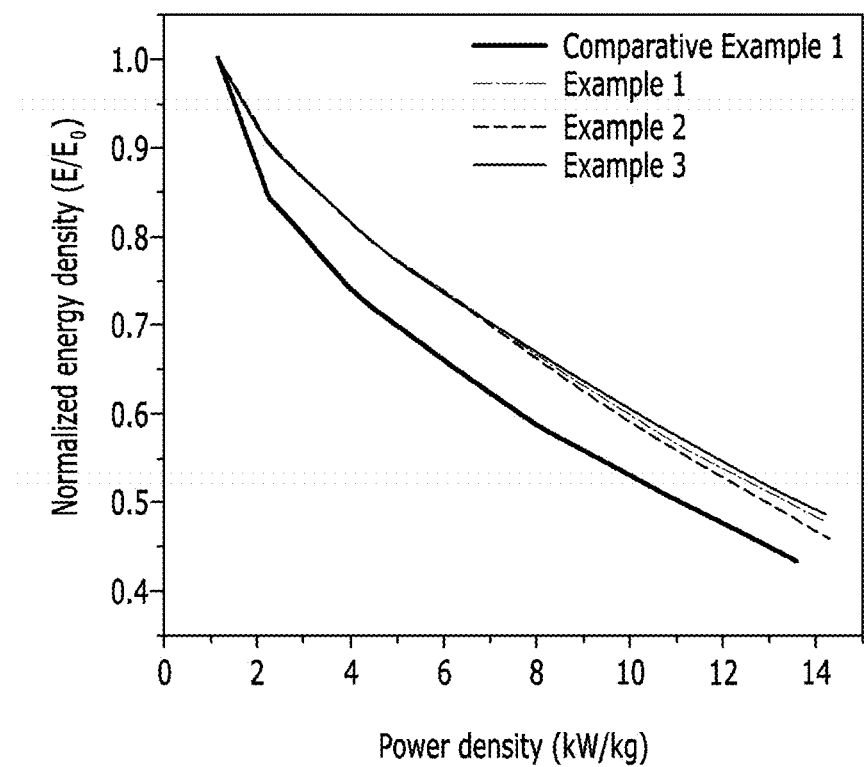
FIG. 14 is a graph of evaluation of output characteristics of the anode materials of Examples 1 to 3 and Comparative Example 1.

Experimental Example 3 In the same manner as in Experimental Example 2, the anode materials of Examples 1 to 3 and Comparative Example 1 were used to manufacture electrodes, and a 1 M $Li_2SO_4$ electrolyte was impregnated into each of the manufactured electrodes and stabilized, followed by evaluating output characteristics using a platinum counter electrode and an SCE reference electrode in the potential range of −1.2 V to −0.2 V under conditions of 1 kW/kg to 20 kW/kg and 1 A/g to 30 A/g. The results are shown in FIG. 14.

As a result, the anode materials of Examples 1 to in which the vanadium oxide-carbon based material complex was doped with Cu, Al, or Mn exhibited excellent output characteristics, as compared with the undoped anode material of Comparative Example 1. These results indicate that output characteristics of the electrode material may be further improved by doping the vanadium oxide-carbon based material complex.

Experimental Example 4

A $Li_2SO_4$ electrolyte was impregnated into the electrodes including each of the anode materials of Examples 1 to 3 and Comparative Example 1 and stabilized, followed by cyclic voltammetry using a platinum counter electrode and an SCE reference electrode in the potential range of −1.2 V to −0.2 V at a scan rate of 10 mV/s. The results are shown in Table 2 below.

TABLE 2

|  | Doping element | Capacitance (F/g @1.33 A/g) |
| --- | --- | --- |
| Example 1 | Al | 363 |
| Example 2 | Mn | 442 |
| Example 3 | Cu | 321 |
| Comparative Example 1 | — | 318 |

As a result, Examples 1 to 3 exhibited improved capacitance, as compared with Comparative Example 1. Particularly, Examples 1 and 2 doped with Al or Mn exhibited greatly increased capacitance of 350 F/g or more. In contrast, Example 3 doped with Cu exhibited low capacitance due to a relatively low charge transfer, despite metal doping, as compared with Examples 1 and 2.

The invention claimed is:

1. An anode material, the anode material comprising a metal oxide-conductive inorganic material complex including a metal oxide and a conductive inorganic material bound to the metal oxide, wherein the conductive inorganic material comprises any one or two or more of carbon based materials selected from the group consisting of carbon nanotubes, carbon nanofiber, carbon nanorods, and vapor grown carbon fiber,
wherein the complex is doped with at least one doping element of Mn and Al, and
wherein the metal oxide comprises vanadium oxide and has a plate-shaped particle structure and the complex has a plate-shaped laminate structure where the conductive inorganic material is interposed between a plurality of plate-shaped metal oxide particles.

2. The anode material of claim 1, wherein the doping element is present in an amount of 0.1 at % to 30 at % with respect to the total amount of the atoms constituting the complex.

3. The anode material of claim 1, wherein the metal oxide is comprised in an amount of 1 to 30 parts by weight with respect to 100 parts by weight of the conductive inorganic material.

4. The anode material of claim 1, wherein the conductive inorganic material comprises carbon nanotubes.

5. An anode for a pseudocapacitor, the anode comprising the anode material of claim 1.

6. A pseudocapacitor comprising the anode material of claim 1.

* * * * *